UNITED STATES PATENT OFFICE.

FRITZ GÜNTHER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PROCESS OF PRODUCING COLORATIONS ON FIBER.

1,176,363.  Specification of Letters Patent.  Patented Mar. 21, 1916.

No Drawing.  Application filed September 5, 1913. Serial No. 788,272.

*To all whom it may concern:*

Be it known that I, FRITZ GÜNTHER, citizen of the German Empire, residing at Ludwigshafen-on-the-Rhine, Germany, have invented new and useful Improvements in Processes of Producing Colorations on Fiber, of which the following is a specification.

I have found that valuable shades can be obtained on fiber by applying the condensation product of acetone with 1.8-naphthalene-diamin-4-sulfonic acid to the said fiber and then developing with an unsulfonated diazo compound. The shades obtained are characterized by their great fastness and by their capability of being discharged. If desired, the said acetone compound can be printed on material which has already been prepared with beta-naphthol, or with any other substance or substances suitable for padding and developing, whereupon, on developing with a diazo compound, colored patterns can be obtained. The acetone compound of 1.8-naphthalene-diamin-4-sulfonic acid can be obtained as described in the specification of German Patent No. 122,475.

The following example will serve to illustrate further the nature of this invention, which, however, is not confined to this example. The parts are by weight.

Mix 15 parts of the acetone condensation product of 1.8-naphthalene-diamin-4-sulfonic acid with water, add 15 parts of 35% caustic soda solution and 50 parts of Turkey red oil, and make up the whole with water to 1,000 parts. Pad the material with the solution thus obtained, dry the material and then develop it with a diazo solution obtained from 23 parts of para-nitranilin per 1,000, which has been treated with an excess of sodium acetate to remove mineral acid. Allow to stand for several hours, then wash and soap. In this way a pure blue-black shade is obtained which is fast against the action of chlorin and light and which can be discharged leaving pure white effects.

A similar procedure can be adopted when other unsulfonated diazo compounds are employed, such for instance as the diazo compounds from para-chlor-ortho-anisidin and alpha-naphthylamin, whereby claret shades are obtained.

Now what I claim is:—

1. The process of producing colorations on fiber which consists in applying the condensation product of acetone with 1.8-naphthalene-diamin-4-sulfonic acid to the fiber and then developing with a diazo compound.

2. The process of producing colorations on fiber which consists in applying the condensation product of acetone with 1.8-naphthalene-diamin-4-sulfonic acid and other substance suitable for padding and developing to the fiber and then developing with a diazo compound.

3. The process of producing colorations on fiber which consists in applying the condensation product of acetone with 1.8-naphthalene-diamin-4-sulfonic acid and beta-naphthol to the fiber and then developing with a diazo compound.

4. The process of producing colorations on fiber which consists in applying the condensation product of acetone with 1.8-naphthalene-diamin-4-sulfonic acid to the fiber and then developing with diazo para-nitranilin.

In testimony whereof I have hereunto set my hand in the presence of two subscribing witnesses.

FRITZ GÜNTHER.

Witnesses:
JOSEPH PFEIFFER,
J. ALEC LLOYD.